US010292525B2

United States Patent
D'Errico et al.

(10) Patent No.: US 10,292,525 B2
(45) Date of Patent: May 21, 2019

(54) FLUID-AGITATING TANK ASSEMBLY FOR A MACHINE FOR FILLING CONTAINERS

(71) Applicant: Sidel S.p.A. CON SOCIO UNICO, Parma (IT)

(72) Inventors: Stefano D'Errico, Parma (IT); Vincenzo Galotto, Parma (IT)

(73) Assignee: SIDEL S.P.A. CON SOCIO UNICO, Parma (IT)

( * ) Notice: Subject to any disclaimer, the term of this patent is extended or adjusted under 35 U.S.C. 154(b) by 704 days.

(21) Appl. No.: 14/839,596

(22) Filed: Aug. 28, 2015

(65) Prior Publication Data

US 2016/0058237 A1     Mar. 3, 2016

(30) Foreign Application Priority Data

Aug. 29, 2014 (EP) .................................. 14182789

(51) Int. Cl.
*A47J 31/44* (2006.01)
*B01F 7/00* (2006.01)
(Continued)

(52) U.S. Cl.
CPC ......... *A47J 31/4403* (2013.01); *B01F 3/1221* (2013.01); *B01F 7/001* (2013.01);
(Continued)

(58) Field of Classification Search
CPC ... A47J 31/4403; B01F 7/0065; B01F 7/1675; B01F 7/183; B01F 7/247; B01F 13/08; B01F 13/0872
(Continued)

(56) References Cited

U.S. PATENT DOCUMENTS 3,352,543 A * 11/1967 Niederman ......... B01F 7/00391
366/286
3,675,902 A    7/1972 Marshall
(Continued)

FOREIGN PATENT DOCUMENTS

| EP | 0698253 A1 | 5/1994 |
| EP | 1347093 A1 | 9/2003 |
| FR | 2397679 A1 | 11/1978 |

OTHER PUBLICATIONS

Extended European Search Report dated Feb. 26, 2015 by the European Patent Office in counterpart European Patent Application No. 14182789.9.

*Primary Examiner* — Walter D. Griffin
*Assistant Examiner* — Marc C Howell
(74) *Attorney, Agent, or Firm* — Finnegan, Henderson, Farabow, Garrett & Dunner LLP

(57) ABSTRACT

A fluid-agitating tank assembly is disclosed. The tank assembly includes a tank filled with a fluid, and an agitator disposed in the tank so as to be at least partially immersed in the fluid and supported by the tank in a rotatable manner about an axis. The agitator includes a double helix disposed in an upper volume of the tank and adapted to act on the fluid to transform unidirectional rotation of the agitator about the axis into a bidirectional movement of the fluid in the tank towards bottom and top portions of the tank, and at least one rotary blade projecting transversally from the axis, disposed in a lower volume of the tank, and rotating about the axis to move the fluid towards at least one lateral outlet of the tank.

6 Claims, 5 Drawing Sheets

(51) Int. Cl.
  *B01F 7/24* (2006.01)
  *B67C 3/22* (2006.01)
  *B01F 3/12* (2006.01)
  *B01F 13/08* (2006.01)
  *B01F 7/16* (2006.01)
  *B01F 7/18* (2006.01)

(52) U.S. Cl.
  CPC ........ *B01F 7/0065* (2013.01); *B01F 7/00275* (2013.01); *B01F 7/00391* (2013.01); *B01F 7/00433* (2013.01); *B01F 7/1675* (2013.01); *B01F 7/183* (2013.01); *B01F 7/246* (2013.01); *B01F 7/247* (2013.01); *B01F 13/08* (2013.01); *B01F 13/0872* (2013.01); *B67C 3/22* (2013.01); *B01F 2215/0022* (2013.01); *B67C 2003/228* (2013.01)

(58) Field of Classification Search
  USPC .......................................................... 366/266
  See application file for complete search history.

(56) References Cited

U.S. PATENT DOCUMENTS

| | | | | |
|---|---|---|---|---|
| 3,896,976 | A | * | 7/1975 | Ligouzat ............... B01L 3/0293 |
| | | | | 222/228 |
| 4,007,016 | A | | 2/1977 | Weber |
| 4,934,828 | A | * | 6/1990 | Janssen ................. B01F 7/1675 |
| | | | | 366/307 |
| 4,993,841 | A | * | 2/1991 | Lofgren ............. B01F 13/0827 |
| | | | | 366/274 |
| 5,232,496 | A | * | 8/1993 | Jennings ............. B01F 7/00908 |
| | | | | 106/638 |
| 5,382,092 | A | * | 1/1995 | Okamoto ................ B01F 7/246 |
| | | | | 366/320 |

* cited by examiner

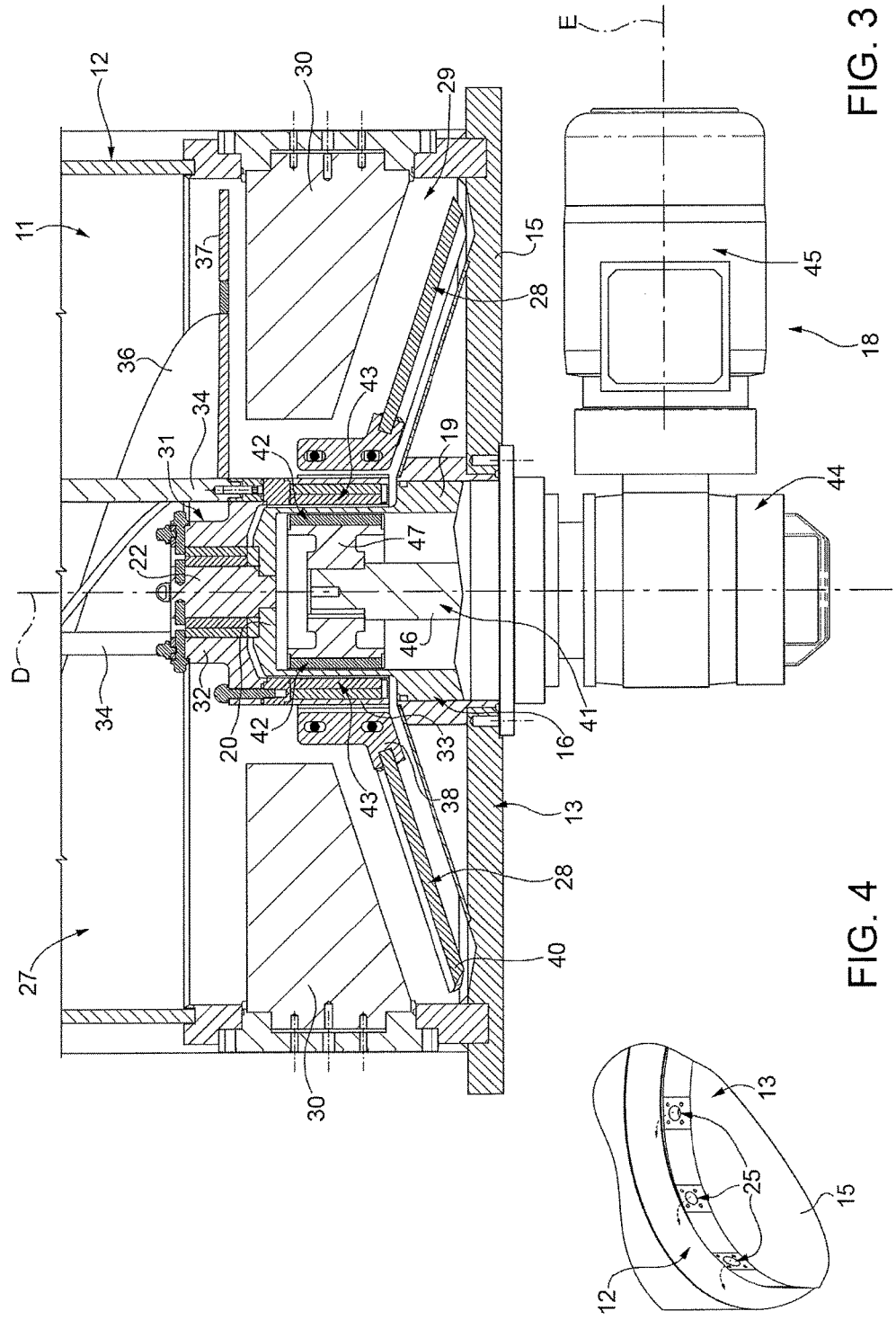

FLUID-AGITATING TANK ASSEMBLY FOR A MACHINE FOR FILLING CONTAINERS

CROSS-REFERENCE TO RELATED APPLICATIONS

This application claims the benefit of priority of European Patent Application No. 14182789.9, filed Aug. 29, 2014, which is incorporated herein by reference.

TECHNICAL FIELD

The present invention relates to a fluid-agitating tank assembly for a machine for filling containers.

The present invention may be used to particular advantage for fluids with particles, such as soft drinks or beverages with fruit particles, which the following description will refer to, although this is in no way intended to limit the scope of protection as defined by the accompanying claims.

BACKGROUND ART

As known, there is an increasing demand from the market for soft drinks or beverages containing fruit particles or pieces, such as soft fruit bits, normally available in cubes or slices, fruit fibers, containing large portions of fruit cellulose, and fruit sacs, i.e. intact "pouch-like" structures of a citrus fruit, filled with or without liquid and having lengths up to 5-8 mm.

These kinds of beverages are normally stored in tanks before being delivered to the filling machines and then closed and sealed into containers or bottles for retail.

In many cases, these beverages have to be delivered to the containers in a hot state and therefore they have to be heated when they are stored in the tanks.

Plus, they have to be continuously moved by an agitator housed in the tank in order to avoid that the fruit particles float on the free surface of the beverages or sink to the bottom of the tank.

Agitators are typically formed by a shaft immersed in the tank, rotatable about its axis and provided with two or more blades acting on the whole beverage.

This kind of agitators tends to damage the fruit particles, in particular when these particles are sacs. The damaging action on the fruit particles is further aggravated when the action of the blades of the agitator is combined with heating the beverage in the tank. In addition, relevant damages may be produced on the fruit particles during spillage of the fluid through one or more outlets, due to the whirling movement impressed to the fluid.

Furthermore, it is normally requested that the fruit particles are kept in suspension in the fluid before being delivered to the containers; the standard agitators may be suitable for particles naturally floating or sinking but not for both of them.

DISCLOSURE OF INVENTION

It is an object of the present invention to provide a fluid-agitating tank assembly for a machine for filling containers, designed to eliminate the aforementioned drawbacks, and which is capable of performing a gentle mixing action on the fluid without damaging possible particles contained therein.

It is another object of the present invention to provide a fluid-agitating tank assembly for a machine for filling containers, which keeps particles in suspension in the fluid, irrespective of whether such particles naturally tend to float or sink.

According to the present invention, there is provided a fluid-agitating tank assembly for a machine for filling containers, as claimed in claim 1.

BRIEF DESCRIPTION OF THE DRAWINGS

A non-limiting embodiment of the present invention will be described by way of example with reference to the accompanying drawings, in which:

FIG. 3 shows a larger-scale detail of the FIG. 2 tank assembly;

FIG. 4 shows a larger-scale perspective view of another detail of the FIG. 2 tank assembly;

BEST MODE FOR CARRYING OUT THE INVENTION

Figure 1:
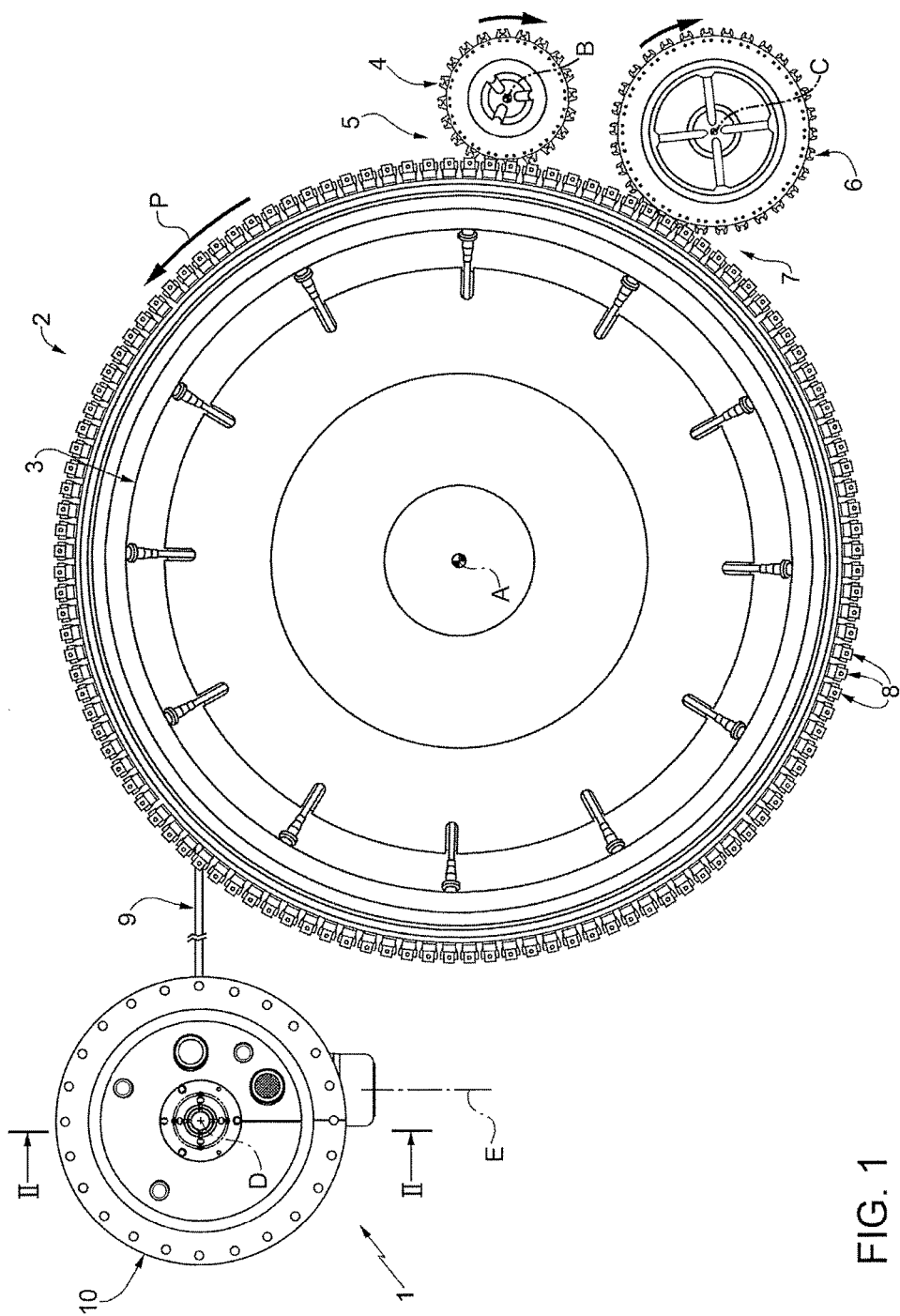
FIG. 1 shows a schematic top plan view, with parts removed for clarity, of a filling machine fed with a fluid coming from a tank assembly according to the present invention.
Figure 2:
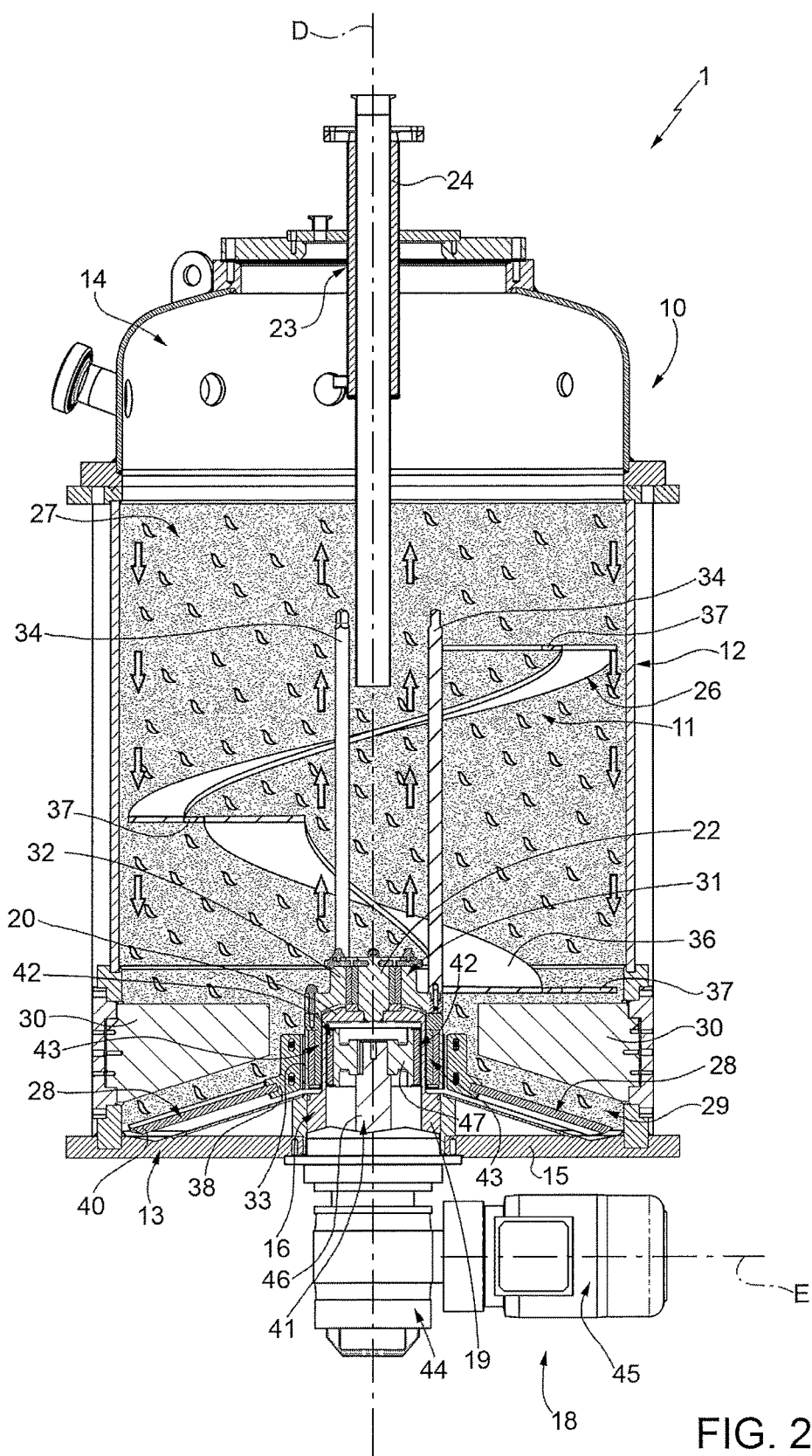
FIG. 2 shows a larger-scale section of the tank assembly of the present invention along line II-II of FIG. 1.

Number 1 in FIGS. 1 and 2 indicates as a whole a fluid-agitating tank assembly for a machine 2 (FIG. 1) for filling containers (known per se and not shown).

As used therein, the term "fluid" relates to any pourable product having at least a liquid fraction.

The present invention is used to particular advantage for fluids with particles, i.e. fluids having not only a liquid fraction but also solid parts (the particles) immersed therein; typical examples are soft drinks or beverages containing fruit particles, such as soft fruit bits, fruit fibers and fruit sacs.

The term "fluid" may also encompass a pourable product formed by two or more miscible liquids, which have to be continuously agitated for improving their mixing.

Tank assembly 1 is used to store and agitate a fluid with particles destined to be fed to machine 2 and to fill a plurality of containers handled by such machine.

In particular, machine 2 is of known type and basically comprises a carousel 3, mounted to rotate continuously (anticlockwise in FIG. 1) about a vertical axis A perpendicular to the FIG. 1 plane. The carousel 3 receives a succession of empty containers from an input star wheel 4, which is connected to carousel 3 at a first transfer station 5 and is mounted to rotate continuously about a respective longitudinal axis B parallel to axis A. The carousel 3 releases a succession of filled containers to an output star wheel 6, which is connected to carousel 3 at a second transfer station 7 and is mounted to rotate continuously about a respective longitudinal axis C parallel to axes A and B.

Machine 2 further comprises a plurality of filling units 8, which are equally spaced angularly about axis A, are mounted along a peripheral portion of carousel 3, and are moved by the carousel 3 itself along a path P extending about axis A and through stations 5 and 7.

The fluid is delivered in a known manner from tank assembly 1 to machine 2 through a fluid delivering circuit 9, only partially shown in FIG. 1.

With reference to FIGS. 1 and 2, tank assembly 1 basically comprises a tank 10 filled in use with the aforementioned fluid with particles and having an axis D parallel to axes A, B and C, and an agitator 11 coaxially housed in tank 10 so as to be immersed in use at least partly in the fluid and supported by the tank 10 itself in a rotatable manner about axis D.

In the preferred embodiment shown in the present application, tank 10 is completely sealed towards the external environment so as to maintain the fluid in aseptic conditions.

As visible in FIG. 2, tank 10 has a substantially cylindrical lateral wall 12 of axis D and is closed, at its opposite axial ends, by a bottom wall 13 and a top wall 14.

In particular, bottom wall 13 comprises an outer disk-shaped annular portion 15 and a central recessed portion 16, which projects inwards of the tank 10 from a radially inner edge of annular portion 15 and is adapted to partially house an actuator assembly 18 for moving agitator 11 about axis D, as it will be explained in greater details later on.

As visible in particular in FIG. 3, recessed portion 16 is coaxial with axis D, has an inverted cup-shaped configuration and includes a cylindrical annular wall 19 of axis D and an upper disk-shaped cover 20; more precisely, annular wall 19 has one axial end secured to the radially inner edge of annular portion 19, whilst cover 20 is secured to the opposite axial end of annular wall 19.

Cover 20 is also provided with a central through hole 21 of axis D, engaged in a fluid-tight manner by a fixed pin 22, which is adapted to support agitator 11 in a rotary manner about the axis D itself.

Top wall 14 is provided with a central through hole 23 of axis D, engaged in a fluid-tight manner by a feeding conduit 24 for feeding the fluid with particles into the tank 10.

In the preferred embodiment shown in the present application, top wall 14 has a dome-shaped configuration.

A heating apparatus (known per se and not shown) is adapted to be incorporated into, or applied to, lateral wall 12 of tank 10 for heating the fluid contained therein. Preferably, the heating apparatus may consist of a cavity formed in lateral wall 12, through which a heating medium continuously circulate so as to exchange heat with the fluid contained in tank 10.

As visible in particular in FIG. 4, lateral wall is provided with one or more outlet openings 25, which can be selectively connected to fluid delivering circuit 9 for delivering the fluid to machine 2. In particular, outlet openings 25 are formed into a bottom edge portion of lateral wall 12. Alternatively, outlet openings 25 may be also formed into a peripheral region of annular portion 15 of bottom wall 13, in a position adjacent to lateral wall 12.

Figure 5:
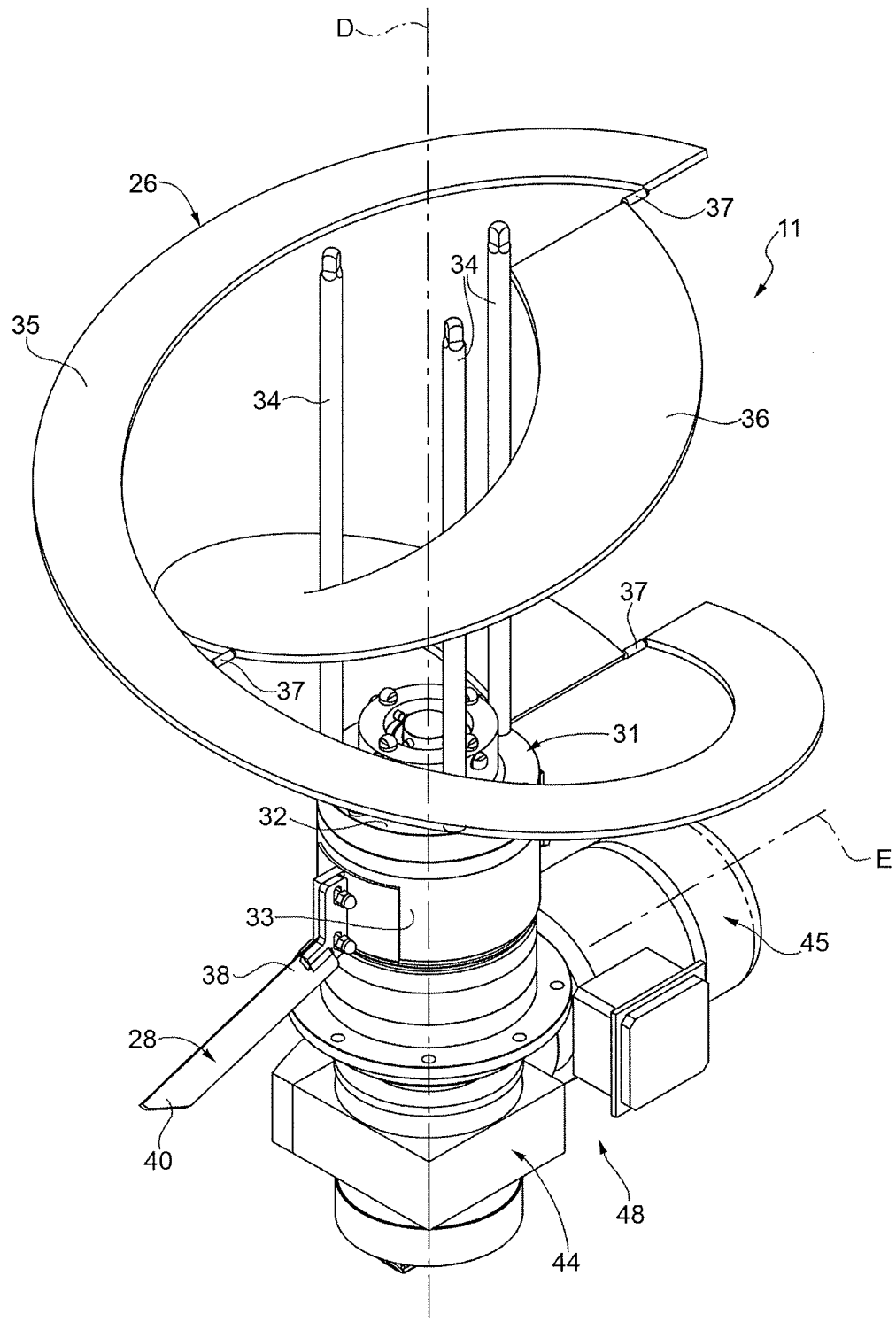
FIG. 5 shows a larger-scale perspective view of an agitator of the FIG. 2 tank assembly.
Figure 6:
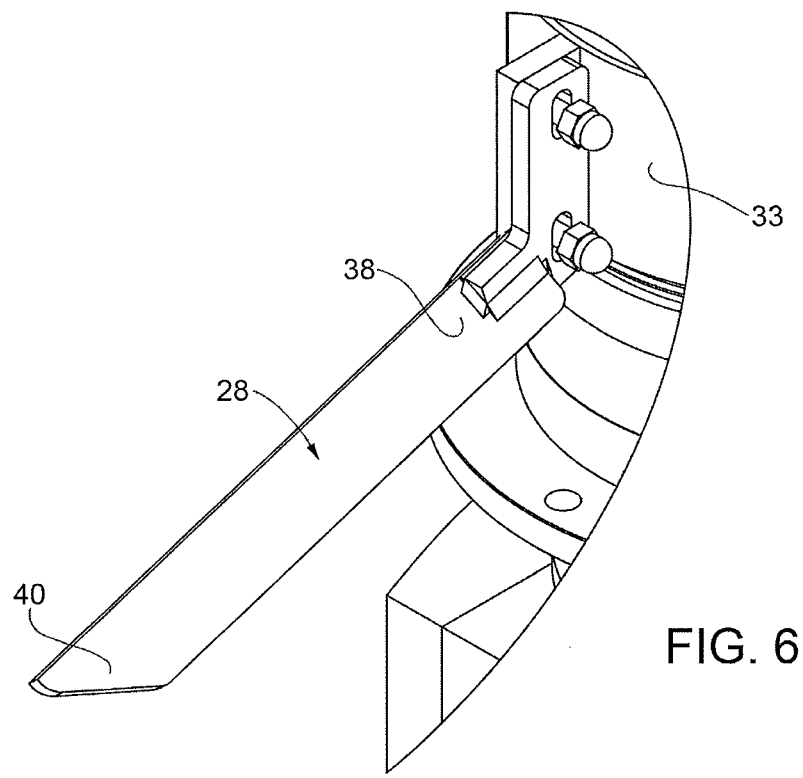
FIG. 6 shows a larger-scale perspective view of a blade of the FIG. 5 agitator.

With reference to FIGS. 2, 3 and 5, agitator 11 comprises:
a double helix 26 housed in an upper volume 27 of tank 10 and acting in use on the fluid contained in the tank 10 itself to transform unidirectional rotation of the agitator 11 about axis D into bidirectional movement of the fluid in the tank 10 towards bottom and top walls 13, 14; and
one or more rotary blades 28, two in the example shown, housed in a bottom volume 29 of tank 10 and projecting transversally from axis D to centrifugally move in use the fluid towards outlet openings 25.

Tank assembly 1 advantageously comprises a plurality of fixed blades 30, two in the example shown, projecting inwards of the tank 10 from lateral wall 12, equally spaced angularly from each other about axis D and adapted to at least in part decouple or separate from one another the fluid motions in the upper and bottom volumes 27, 29 of the tank 10.

In practice, fixed blades 30 operates like breakwaters and divide the internal volume of tank 10 into upper and bottom volumes 27, 29; in particular, upper volume 27 is delimited by top wall 14, by fixed blades 30 and by an upper portion of lateral wall 12 extending above the fixed blades 30; bottom volume 29 is delimited by bottom wall 13, by fixed blades 30 and by a lower portion of lateral wall 12 extending below the fixed blades 30.

In the example shown, each fixed blade 30 has a plane configuration and is tapered towards axis D. More specifically, each fixed blade 30 has a profile shaped like a rectangular trapezium with two axial sides, one radial side and a slanted side facing bottom wall 13.

Double helix 26 and rotary blades 28 are both carried by a rotary element 31 in turn mounted onto fixed pin 22 to rotate about axis D.

In particular, double helix 26 projects cantilevered in upper volume 27 of tank 10 from rotary element 31, whilst rotary blades 28 projects cantilevered in bottom volume 29 of tank 10 from the same rotary element 31. In practice, double helix 26 and rotary blades 28 are substantially arranged on opposite axial sides of rotary element 31.

More specifically, rotary element 31 is substantially bell-shaped and comprises an upper collar 32, engaged by fixed pin 22, and a cylindrical lateral portion 33 projecting cantilevered in bottom volume 29 of tank 10 from collar 32 and surrounding with radial play annular wall 19 of recessed portion 16 of bottom wall 13.

Double helix 26 is in particular wound about a plurality of bars 34 projecting cantilevered from collar 32 in upper volume 27 of tank 10; in greater details, bars 34 extend parallel to axis D and are equally spaced angularly about the axis D itself.

Double helix 26 comprises a first helical element 35 and a second helical element 36, carried by bars 34 and counterposed to one another for imparting the fluid opposite movements towards bottom and top walls 13, 14 of tank 10.

In other words, helical elements 35, 36 are wound round axis D in opposite directions by considering a given advancing direction along the axis D itself.

In the example shown in FIGS. 2 and 5, helical element 35 is left-handed and produces in use a substantially axial fluid flow directed towards bottom wall 13 when the agitator 11 is turned clockwise about axis D; in a completely different manner, helical element 36 is right-handed and produces in use a substantially axial fluid flow directed towards top wall 14 when the agitator 11 is turned clockwise about axis D; it is however clear that helical element 35 may be also right-handed and helical element 36 may be left-handed with opposite actions on the fluid as a result of the same direction of rotation of the agitator 11 about axis D.

In the example shown, helical element 35 has a radius larger than the radius of helical element 36 with respect to axis D; in practice, helical element 36 is arranged inside helical element 35.

In greater details, both helical elements 35, 36 are secured to bars 34 by a plurality of arms 37 projecting radially from the bars 34 themselves.

Rotary blades 28 extend transversally from lateral portion 33 towards lateral wall 12 and annular portion 13 of bottom wall 13. In particular, each rotary blade 28 has a substantially plane configuration and extends transversally to both lateral wall 12 and annular portion 15 of bottom wall 13;

each rotary blade 28 is slanted with respect to axis D as well as to annular portion 15 of bottom wall 13, and has a root portion 38 located at an upper axial level than its free end portion 40.

More specifically, end portion 40 of each rotary blade 28 is arranged adjacent to annular portion 15 of bottom wall 13 and to the part of lateral wall 12 provided with outlet openings 25; as visible in FIGS. 2 and 3, end portion 40 of each rotary blade 28 slides in close proximity to annular portion 15 so as to perform a cleaning action on the bottom part of tank 10 while imparting a centrifugal movement to the fluid and particles towards outlet openings 25.

In the example shown in FIGS. 2, 4, 5 and 6, each rotary blade 28 lies on a plane transversal to axis D and preferably having an inclination of about 45° with respect to the axis D itself.

Figure 7:
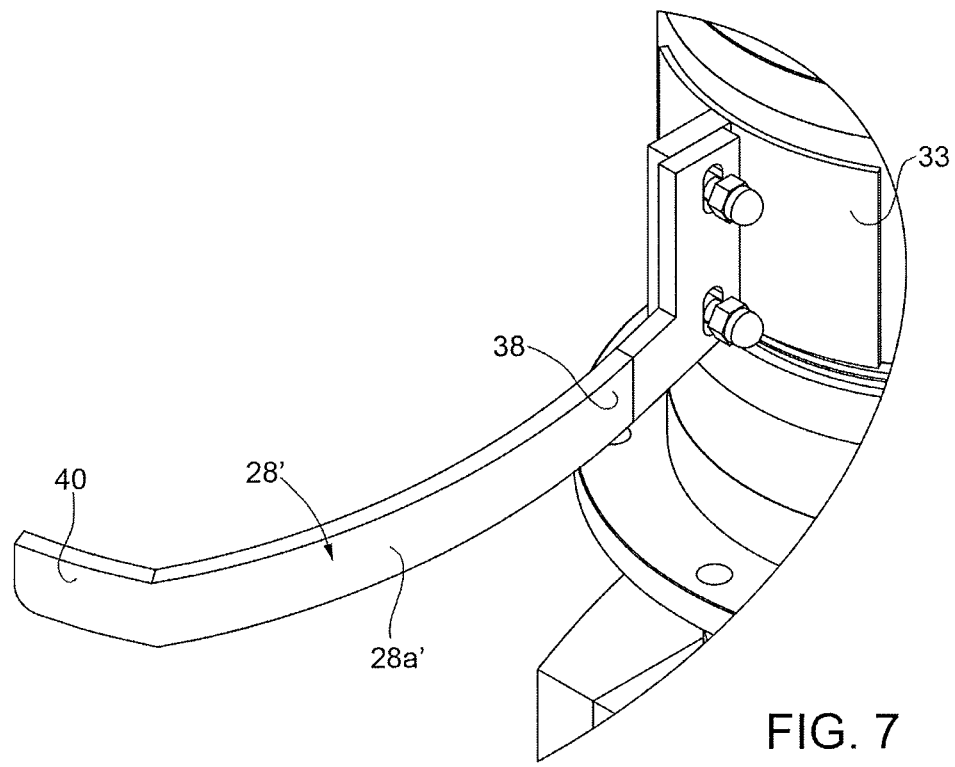
FIG. 7 shows a possible variant of the FIG. 6 blade.

The variant of FIG. 7 shows another possible configuration of the rotary blades, each one indicated as a whole with reference 28'; rotary blades 28 and 28' being similar to one another, the following description is limited to the differences between them, and using the same references, where possible, for identical or corresponding parts.

In particular, in this case, each rotary blade 28' substantially has a J-shaped configuration in a plane orthogonal to axis D.

Each rotary blade 28' is formed by a curved main segment 28a' angled with respect to free end portion 40. More specifically, main segment 28a', and free end portion 40 define a convex configuration of the relative rotary blade 28' in the direction of rotation thereof about axis D so as to exert a pushing action on the fluid and the particles towards outlet openings 25.

With reference to FIGS. 2 and 3, actuator assembly 18 extends fully outside tank 10 as well as below bottom wall 13 and selectively activated to drive agitator 11 by means of magnetic attraction, as explained hereafter.

In particular, actuator assembly 18 comprises a rotary driving member 41 housed with radial play within the hollow region of recessed portion 16 of tank 10 and provided with driving permanent magnets 42 adapted to drive into rotation by electromagnetic interaction corresponding dragged permanent magnets 43 provided on lateral portion 33 of rotary element 31.

More specifically, actuator assembly 18 comprises a support casing 44, secured in a cantilevered manner to an end edge of recessed portion 16 of bottom wall 13 opposite cover 20, motor means 45, housed within support casing 44, and the rotary driving member 41, which is coaxial with axis D and externally protrudes from the support casing 44 to engage the hollow region of recessed portion 16 of tank 10.

In greater details, rotary driving member 41 comprises a shaft 46 of axis D, protruding from support casing 44, and a wheel 48, secured to a free end of shaft 46 and carrying driving magnets 42 equally spaced angularly about the axis D itself.

In a completely similar way, dragged permanent magnets 43 are arranged equally spaced angularly on lateral portion 33 of rotary element 31 with respect to axis D.

In practice, driving permanent magnets 42 and dragged permanent magnets 43 are placed on opposite sides of annular wall 19 of recessed portion 16 at distances therefrom sufficient to allow magnetic interaction.

In the example shown in FIGS. 2 and 3, motor means 45 have an axis E orthogonal to axis D; therefore, a transmission (known per se and not shown), for instance consisting of bevel gears, has to be interposed between motor means 45 and shaft 46 of rotary driving member 41.

In use, activation of motor means 45 imparts a rotation in a given direction (clockwise in FIG. 2) about axis D to rotary driving member 41, which in turn induces agitator 11 to rotate about the same axis as a result of magnetic interaction between magnets 42 and 43. No physical contact occurs between actuator assembly 18 and agitator 11, so that any possible contamination of the fluid inside the tank 10 is avoided.

Continuous rotation of agitator 11 produces two different effects:

in upper volume 27 of tank 10, a bidirectional movement of the fluid and the particles substantially parallel to axis D and towards bottom and top walls 13, 14, due to the action of double helix 26; and in bottom volume 29 of tank 10, a centrifugal movement of the fluid and particles towards outlet openings 25 due to the action of rotary blades 28 or 28'.

In the example shown, helical element 35 of double helix 26 imparts a descendant axial movement towards bottom wall 13 to the fluid and particles in the peripheral region of the tank 10, whilst helical element 36 imparts an ascendant axial movement towards top wall 14 to the fluid and particles in the central region of the tank 10 itself.

In this way, the particles contained in the fluid are forced to move downwards and upwards, so creating a continuous circulation in the tank 10. The movements keep the particles in suspension in the fluid irrespective of the natural tendency of such particles to float or sink.

Bars 34 have the function to avoid creation of vortexes as well as to prevent possible formation of fruit agglomerates. Rotary blades 28 or 28' exert a continuous centrifugal pushing action on the fluid and particles to ease spillage thereof from output openings 25.

By their rotation, blades 28 or 28' also induce a "sucking" action of the fluid from the lowest zone of upper volume 27 into bottom volume 29.

Due to their close vicinity to annular portion 15 of bottom wall 13, free end portions 40 of rotary blades 28 or 28' also perform a cleaning action on the bottom part of tank 10 so avoiding formation of deposits.

Fixed blades 30 allow to avoid or at least to reduce reciprocal influence of fluid motions in upper and bottom volumes 27, 29 of tank 10.

Fixed blades 30 are configured in such a way to offer the minimum resistance to the fluid motions due to the necessity of limiting power consumption and avoiding possible overload of motor means 45; their profiles are therefore optimized to limit both power consumption of motor means 45 and interference between the fluid motions in the upper and bottom volumes 27, 29 of the tank 10.

The advantages of tank assembly 1 according to the present invention will be clear from the foregoing description.

In particular, double helix 26 and rotary blades 28, 28' of agitator 11 are configured to perform a very gentle action on the fruit particles, so avoiding any possible risk of producing damages, in particular to fruit particles constituted by sacs.

As already mentioned above, the combination of the two counter-posed helical elements 35, 36 with rotary blades 28, 28' allows a good mixing action in the fluid contained in the tank 10, suitable for both floating and sinking particles, as well as absence of deposits at the bottom thereof or in proximity of outlet openings 25, along with a gentle pushing action on the fluid and particles outwards of the tank 10.

Thanks to the arrangement of helical elements 35, 36 very close to the lateral wall 12, where the heating apparatus is preferably placed, a very good heat exchange action with the fluid can be achieved.

Clearly, changes may be made to tank assembly 1 as described and illustrated herein without, however, departing from the scope as defined in the accompanying claims.

The invention claimed is:

1. A fluid-agitating tank assembly for a machine for filling containers, the tank assembly comprising:
   a tank configured to receive a fluid, the tank having a longitudinal axis and comprising:
      a cylindrical lateral wall having opposite axial ends,
      a first wall closing one axial end of the cylindrical lateral wall,
      a second annular wall closing the another axial end of the cylindrical lateral wall, and
      a recessed portion situated within an opening of the second annular wall, the recessed portion projecting into the tank in a direction parallel with the longitudinal axis of the tank, wherein the recessed portion includes a cover;
   an agitator disposed at least partially within the tank and supported on the cover of the recessed portion, wherein the agitator is configured to rotate about the longitudinal axis;
   an actuator at least partially housed within the recessed portion and configured to rotate the agitator inside the tank about the longitudinal axis; and
   at least one fixed blade protruding from the cylindrical lateral wall towards the longitudinal axis,
   wherein a first volume of the tank is delimited by the at least one fixed blade, the first wall, and a portion of the cylindrical lateral wall extending between the at least one fixed blade and the first wall,
   wherein a second volume of the tank is delimited by the fixed blades, the second annular wall, and a portion of the cylindrical lateral wall extending between the at least one fixed blade and the second annular wall, and
   wherein the agitator comprises:
      a rotary element configured to be rotated about the longitudinal axis by the actuator,
      a double helix located between the at least one fixed blade and the first wall and comprising a first helical element and a second helical element, wherein the first and second helical elements project from one side of the rotary element into the first volume of the tank so as to transform unidirectional rotation of the rotary element into bidirectional movement of the fluid in the tank towards the first wall and the second wall, and
      at least one rotary blade located between the at least one fixed blade and the second annular wall, the at least one rotary blade projecting laterally from the rotary element into the second volume of the tank, wherein the at least one rotary blade is connected to an opposite side of the rotary element from the helical elements, and wherein the at least one rotary blade is configured to centrifugally move fluid in the second volume of the tank.

2. The tank assembly of claim 1, wherein the at least one rotary blade comprises two rotary blades projecting laterally from the rotary element, wherein the rotary blades are arranged adjacent to the second annular wall and are inclined with respect to the longitudinal axis, and wherein terminal ends of the rotary blades are configured to slide in close proximity to the second annular wall to perform a cleaning action on the second annular wall.

3. The tank assembly of claim 1, wherein the first and second helical elements project cantilevered from the one side of the rotary element in the first volume of the tank, wherein the at least one rotary blade projects cantilevered from the opposite side of the rotary element in the second volume of the tank, and wherein the at least one fixed blade is situated between the double helix and the at least one rotary blade.

4. The tank assembly of claim 1, wherein the at least one fixed blade includes:
   a radially inner portion having a first height parallel to the longitudinal axis; and
   a radially outer portion having a second height parallel to the longitudinal axis, wherein the second height is longer than the first height.

5. The tank assembly of claim 1, wherein the tank additionally includes a plurality of lateral outlets spaced along a circumference of the cylindrical wall and wherein the at least one rotary blade is configured to rotate about the longitudinal axis to move the fluid in the tank towards the plurality of lateral outlets.

6. The tank assembly of claim 1, wherein the first and second helical elements are wound around the longitudinal axis in opposite directions and wherein an axial end of the first helical element has a larger radius with respect to the longitudinal axis than an axial end of the second helical element.

* * * * *